(12) United States Patent
Van Phan et al.

(10) Patent No.: US 10,182,079 B2
(45) Date of Patent: *Jan. 15, 2019

(54) LAWFUL INTERCEPTION AND SECURITY BASED ADMISSION CONTROL FOR PROXIMITY SERVICE

(71) Applicant: Nokia Solutions and Networks Oy, Espoo (FI)

(72) Inventors: Vinh Van Phan, Oulu (FI); Ling Yu, Kauniainen (FI); Kari Veikko Horneman, Oulu (FI)

(73) Assignee: Nokia Solutions and Networks Oy, Espoo (FI)

(*) Notice: Subject to any disclaimer, the term of this patent is extended or adjusted under 35 U.S.C. 154(b) by 2 days.

This patent is subject to a terminal disclaimer.

(21) Appl. No.: 14/897,928

(22) PCT Filed: Aug. 28, 2013

(86) PCT No.: PCT/EP2013/067756
§ 371 (c)(1),
(2) Date: Dec. 11, 2015

(87) PCT Pub. No.: WO2014/198350
PCT Pub. Date: Dec. 18, 2014

(65) Prior Publication Data
US 2016/0134662 A1 May 12, 2016

(30) Foreign Application Priority Data

Jun. 14, 2013 (WO) ................ PCT/CN2013/077258

(51) Int. Cl.
*H04L 29/06* (2006.01)
*H04W 4/02* (2018.01)
(Continued)

(52) U.S. Cl.
CPC ............ *H04L 63/30* (2013.01); *H04B 7/155* (2013.01); *H04L 41/048* (2013.01);
(Continued)

(58) Field of Classification Search
CPC ..... H04L 63/30; H04L 63/0281; H04L 63/06; H04L 63/20; H04L 63/304; H04L 41/048;
(Continued)

(56) References Cited

U.S. PATENT DOCUMENTS 9,544,930 B2 * 1/2017 Yang ........................ H04W 4/70
2004/0203582 A1 * 10/2004 Dorenbosch ............ H04L 63/30
455/406

(Continued)

OTHER PUBLICATIONS

3GPP TSG-SA WG1 Meeting #57, Kyoto, Japan Feb. 13-17, 2012, S1-120068, "Proximity aware service consideration on lawful interception", Institute for Information Industry (III), 3 pgs.
(Continued)

*Primary Examiner* — Ghodrat Jamshidi
(74) *Attorney, Agent, or Firm* — Harrington & Smith

(57) ABSTRACT

There are provided measures for lawful interception and security based admission control for proximity service. Such measures could include detecting a requirement for control in relation to setting up or securing a connection of a proximity service between at least two devices, determining availability of at least one lawful interception and security agent capable of performing an operation relating to lawful interception and/or security in relation to the connection of the proximity service, and performing control in relation to setting up or securing the connection of the proximity service when availability of the at least one lawful interception and security agent is determined.

19 Claims, 8 Drawing Sheets

(51) Int. Cl.
  *H04W 12/02* (2009.01)
  *H04B 7/155* (2006.01)
  *H04W 40/34* (2009.01)
  *H04L 12/24* (2006.01)
  *H04W 8/00* (2009.01)
  *H04W 76/23* (2018.01)
  *H04W 4/80* (2018.01)
  *H04M 3/22* (2006.01)

(52) U.S. Cl.
  CPC .......... *H04L 63/0281* (2013.01); *H04L 63/06* (2013.01); *H04L 63/20* (2013.01); *H04L 63/304* (2013.01); *H04M 3/2281* (2013.01); *H04W 4/023* (2013.01); *H04W 4/80* (2018.02); *H04W 8/005* (2013.01); *H04W 12/02* (2013.01); *H04W 40/34* (2013.01); *H04W 76/23* (2018.02); *H04M 2207/18* (2013.01)

(58) Field of Classification Search
  CPC ...... H04B 7/155; H04M 3/22; H04M 3/2281; H04W 4/008; H04W 4/023; H04W 8/005; H04W 12/02; H04W 40/34; H04W 76/023; H04W 76/043; H04W 4/80; H04W 76/18
  See application file for complete search history.

(56) References Cited

U.S. PATENT DOCUMENTS

| | | | | |
|---|---|---|---|---|
| 2005/0020244 A1* | 1/2005 | Chang | ...................... | H04K 3/41 455/410 |
| 2009/0128286 A1* | 5/2009 | Vitito | ................... | H05K 5/0208 340/5.8 |
| 2009/0298478 A1* | 12/2009 | Tyhurst | ................... | H04W 4/50 455/414.1 |
| 2011/0029667 A1* | 2/2011 | Imbimbo | .............. | H04W 12/02 709/224 |
| 2013/0111312 A1* | 5/2013 | Karmarkar | ............ | H04L 63/104 715/201 |
| 2013/0203380 A1* | 8/2013 | Lin | ........................ | H04W 12/02 455/410 |
| 2014/0243038 A1* | 8/2014 | Schmidt | ............. | H04W 76/023 455/552.1 |
| 2016/0127420 A1* | 5/2016 | Yu | ......................... | H04L 63/304 726/30 |

OTHER PUBLICATIONS

3GPP TSG-SA WG1 Meeting #62, New Delhi, India, May 6-10, 2013, S1-133132, "LS on Proximity Services and Lawful Interception", SA3-LI, 2 pgs.

Qualcomm Incorporated "Proposed solution for direct discovery and communication using E-UTRAN"; S2-130308 (was S2-13xxxx); SA WG2 Meeting #95, Prague, Czech Republic, Jan. 285-Feb. 1, 2013; 10 pages; 3rd Generation Partnership Project (3GPP); Mobile Competence Centre; 650, Route des Lucioles; F-06921 Sophia-Antipolis Cedex; France.

"LS on Proximity Services and Lawful Interception"; SA3LI13_033r1; 3GPP TSG-SA3-Li Meeting #48; Dublin, Ireland, Feb. 5-7, 2013; 2 pages; 3rd Generation Partnership Project (3GPP); Mobile Competence Centre; 650, Route des Lucioles; F-06921 Sophia-Antipolis Cedex; France.

* cited by examiner

US 10,182,079 B2

LAWFUL INTERCEPTION AND SECURITY BASED ADMISSION CONTROL FOR PROXIMITY SERVICE

FIELD

The present invention relates to lawful interception and security based admission control for a proximity service. More specifically, the present invention relates to measures (including methods, apparatuses and computer program products) for facilitating lawful interception and security based admission control for a proximity service.

BACKGROUND

The present disclosure relates to lawful interception (LI) and security issues for proximity services (ProSe) such as D2D communications in the licensed spectrum, i.e. over the air interface of a wireless communication system.

Presently, the LI functionality is located in the core network. However, ProSe is promoting the (at least partly network-controlled) discovery and communication between UEs that are in proximity to each other to be able to use a "direct mode" or "locally-routed" path, which may not involve the core network. Namely, the direct mode path is a direct connection between the two UEs without involving further network elements such as an eNB. The locally-routed path is an indirect connection between the two UEs via an eNB without involving the core network.

Thus, the connection of UEs by proximity service does not involve the core network. Therefore, the LI functionality may not be applicable to ProSe connections and/or any intercepted information may not be available to the core network LI entities.

Accordingly, ProSe connections such as direct D2D communications in the licensed spectrum pose many challenges for the implementation of the required lawful interception (LI) and further desirable security features. Even in network-controlled direct D2D communications, as the user data is exchanged between the devices directly over the air interface and is not routed via any infrastructure network element, monitoring the content of communications is not readily possible with the present LI functionality in the core network. Further, even though the network may control the initial setup and resource allocation of direct D2D communications, it is not readily possible with the present LI functionality in the core network to take full control of the set up and allocated D2D connection, e.g. taking back allocated resources or releasing the D2D connection from misbehaving devices which hold on to the existing D2D connection and misuse it.

One option was discussed in the document "LS on Proximity Services and Lawful Interception from SA3-LI to SA1,2,3" (SA3LI13_033r1, 3GPP TSG-SA3-LI Meeting #48, Dublin, Ireland, 5-7 Feb. 2013) and the document "Solution for direct discovery and communication using E-UTRAN" (S2-130308, SA WG2 Meeting #95, Prague, Czech Republic, 28 Jan.-1 Feb. 2013) to disable ProSe capabilities for UEs under surveillance or move the communication for the UE under surveillance from ProSe communication mode to infrastructure mode. That is, the ProSe communication is disabled for these UEs so that the communication is performed via the core network, so that the LI functionality in the core network is enabled. However, as indicated in the document "LS on Proximity Services and Lawful Interception from SA3-LI to SA1,2,3" mentioned above, detectability issues need to be considered for this option, as LI should be done in a non-detectable manner. In addition, moving ProSe communication to infrastructure mode may degrade the communication performance (e.g. delay and perhaps also throughput), which may not be favorable by the end user and this also means the benefits of ProSe communication may not be achieved as EPC, e.g. P-GW or S-GW is involved in the ProSe communication user plane data transportation.

Thus, there is a need to facilitate lawful interception and security in a case in which devices, including at least one device to be intercepted, use proximity service connections (such as e.g. direct D2D communications over the air interface without routing via any infrastructure network element). In particular, it is desirable to facilitate lawful interception and security based admission control in such case of proximity service connections.

SUMMARY

Various exemplifying embodiments of the present invention aim at addressing at least part of the above issues and/or problems and drawbacks.

Various aspects of exemplifying embodiments of the present invention are set out in the appended claims.

According to an example aspect of the present invention, there is provided a method comprising detecting a requirement for control in relation to setting up or securing a connection of a proximity service between at least two devices, determining availability of at least one lawful interception and security agent capable of performing an operation relating to lawful interception and/or security in relation to the connection of the proximity service, and performing control in relation to setting up or securing the connection of the proximity service when availability of the at least one lawful interception and security agent is determined.

According to an example aspect of the present invention, there is provided an apparatus comprising a processor, and a memory configured to store computer program code, wherein the processor is configured to cause the apparatus to perform: detecting a requirement for control in relation to setting up or securing a connection of a proximity service between at least two devices, determining availability of at least one lawful interception and security agent capable of performing an operation relating to lawful interception and/or security in relation to the connection of the proximity service, and performing control in relation to setting up or securing the connection of the proximity service when availability of the at least one lawful interception and security agent is determined.

According to an example aspect of the present invention, there is provided an apparatus comprising means for detecting a requirement for control in relation to setting up or securing a connection of a proximity service between at least two devices, means for determining availability of at least one lawful interception and security agent capable of performing an operation relating to lawful interception and/or security in relation to the connection of the proximity service, and means for performing control in relation to setting up or securing the connection of the proximity service when availability of the at least one lawful interception and security agent is determined.

According to an example aspect of the present invention, there is provided a computer program product comprising computer-executable computer program code which, when the program code is executed (or run) on a computer or the program is run on a computer (e.g. a computer of an apparatus according to any one of the aforementioned apparatus-related example aspects of the present invention), is configured to cause the computer to carry out the method according to the aforementioned method-related example aspect of the present invention.

The computer program product may comprise or may be embodied as a (tangible) computer-readable (storage) medium or the like, on which the computer-executable computer program code is stored, and/or the program is directly loadable into an internal memory of the computer or a processor thereof.

Further developments and/or modifications of the aforementioned exemplary aspects of the present invention are set out in the following.

By way of exemplifying embodiments of the present invention, lawful interception and security based admission control is facilitated in a case in which devices, including at least one device to be intercepted, use proximity service connections (such as e.g. direct D2D communications over the air interface without routing via any infrastructure network element).

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
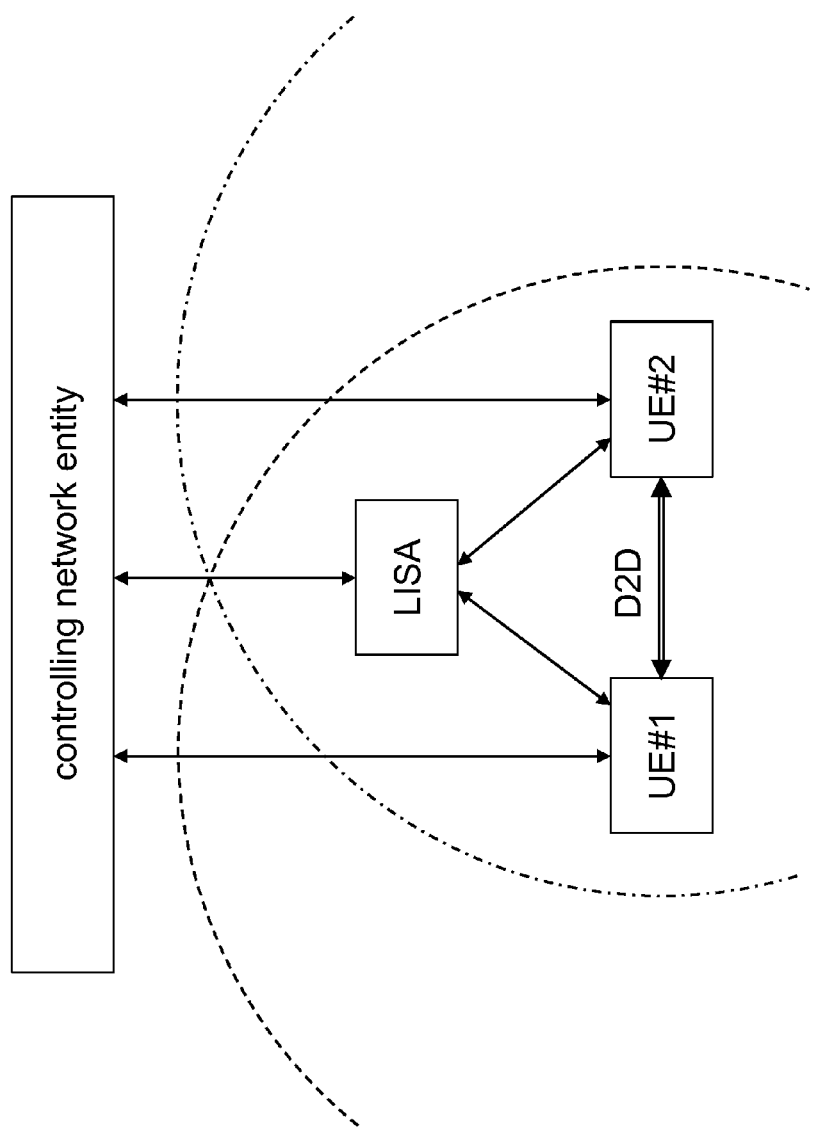
FIG. 1 shows a schematic diagram illustrating a first example of a system configuration according to exemplifying embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplifying network configurations and system deployments. Namely, the present invention and its embodiments are mainly described in relation to 3GPP specifications being used as non-limiting examples for certain exemplifying network configurations and deployments. As such, the description of exemplifying embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long exemplifying embodiments described herein are applicable to it.

In particular, the present invention and its embodiments may be applicable in any wireless communication system and/or system deployment supporting ProSe connections between devices. For example, the present invention and its embodiments are applicable in wireless communication systems and/or system deployments of 3GPP Rel-12 and beyond, i.e. LTE/LTE-A. While hereinafter reference is made to device-to-device (D2D) connections/communications by way of example only, proximity services in the meaning of the present disclosure equally encompass machine-to-machine (M2M) connections/communications, terminal-to-terminal (T2T) connections/communications, peer-to-peer (P2P) connections/communications, or the like.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned. Further, in this description, the term "to perform" should be understood as being equivalent to corresponding terms such as "to carry out", "to execute", "to accomplish", "to process", "to conduct", etc. so that the described exemplifying embodiments and implementations are not limited to a specific kind of realization of respective operations, procedures, and/or functions.

According to exemplifying embodiments of the present invention, in general terms, there are provided measures and mechanisms for facilitating lawful interception and security based admission control in a case in which devices, including at least one device to be intercepted, use proximity service connections.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

FIG. 1 shows a schematic diagram illustrating a first example of a system configuration according to exemplifying embodiments of the present invention.

As shown in FIG. 1, it is assumed that a first device denoted by UE#1 and a second device denoted by UE#2 are involved in a D2D connection (as an example of a ProSe connection), e.g. in the setup or communication phase of such D2D connection. That is to say, UE#1 and UE#2 are attempting to communicate or are communicating with each other using a direct mode D2D connection (as indicated by a two-headed double-line arrow). Both UE#1 and UE#2 are served by a serving/controlling network which is indicated by a controlling network entity which may for example comprise (the functionality of) an eNB, a MME, a S-GW, a P-GW, or the like.

It is to be noted that a ProSe (e.g. D2D) connection may comprise more than two devices, while the present description assumes a ProSe (e.g. D2D) connection between two devices for illustrative purposes only.

As shown in FIG. 1, it is assumed that a lawful interception and security agent (LISA) is located within the proximity service range of at least one device to be intercepted among the two devices in the targeted D2D connection, i.e. UE#1 and UE#2. Namely, the dashed line indicates the edge of the ProSe service range of UE#1, and the dot-dashed line indicates the edge of the ProSe service range of UE#2. The LISA is configured to perform a lawful interception and/or security operation in relation to the D2D connection, i.e. at least one device to be intercepted among the two devices in D2D connection, i.e. UE#1 and UE#2. Such operation may for example comprise one or more of intercepting intercept-related information (IRI) and/or content of communication (CC), reporting the intercepted information to the controlling network entity, forwarding requested information about D2D communications between UE#1 and UE#2, as well as functions in relation to authentication, admission control, and connection and mobility management of UE#1 and/or UE#2. As indicated by two-headed arrows, the LISA of FIG. 1 is assumed to be capable of performing such operation in relation to both UE#1 and UE#2. To this end, the LISA is controlled by the controlling network entity, i.e. from the serving/controlling network of UE#1 and UE#2. Such controlling network entity may thus comprise (the functionality of) a DRSF, ADMF, or the like.

It is noted that more than one LISA may be present and configured to perform a lawful interception and/or security operation in relation to a targeted D2D connection. Namely, a group of LISAs may be located within the proximity service range of at least one device to be intercepted among the two or more devices in the targeted D2D connection and be configured to perform a lawful interception and/or security operation in relation to the D2D connection. That is, the block denoted by LISA in FIG. 1 may represent a group of LISAs, all of which exhibit the same functionality as the LISA, as described above. Thereby, the reliability of the required/desired operation in relation to the targeted D2D connection may be improved.

Figure 2:
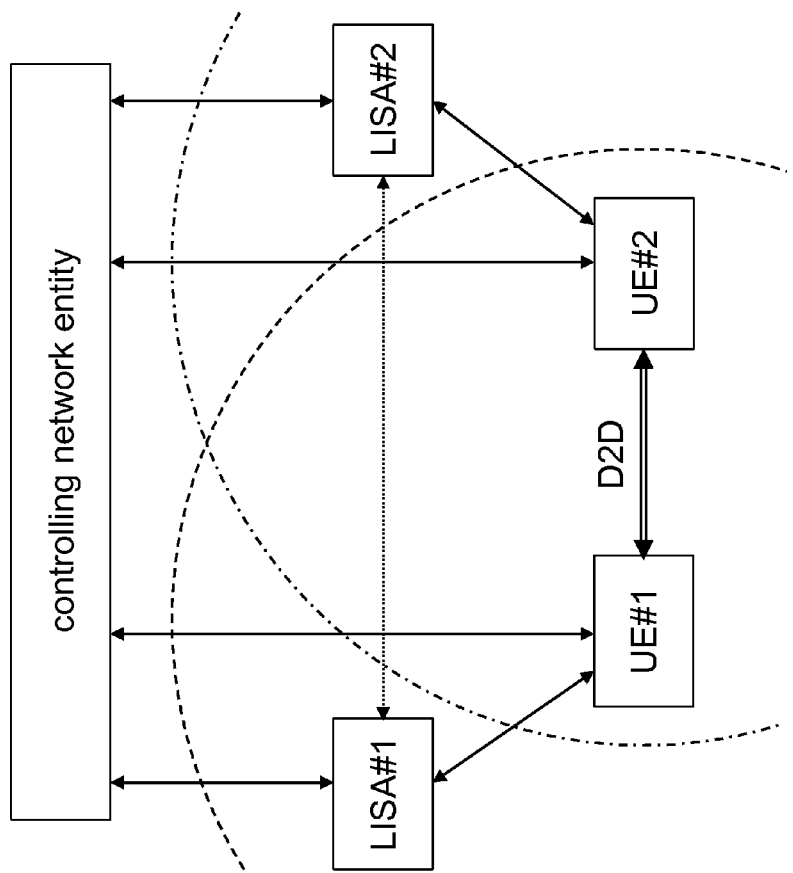
FIG. 2 shows a schematic diagram illustrating a second example of a system configuration according to exemplifying embodiments of the present invention.

FIG. 2 shows a schematic diagram illustrating a second example of a system configuration according to exemplifying embodiments of the present invention.

As shown in FIG. 2, similar to the example configuration of FIG. 1, a ProSe (e.g. D2D) connection between two devices UE#1 and UE#2 is exemplified, and both UE#1 and UE#2 are served by a serving/controlling network which is indicated by a controlling network entity. In this regard, reference is made to the above description of FIG. 1 for further details.

As shown in FIG. 2, in contrast to the example configuration of FIG. 1, it is assumed that two LISAs are located within the proximity service range of the two devices in the targeted D2D connection and are configured to perform a lawful interception and/or security operation in relation to the D2D connection. Namely, a first LISA#1 is located within the ProSe service range of UE#1 and is configured to perform a lawful interception and/or security operation in relation to UE#1 to be intercepted of the targeted D2D connection, and a second LISA#2 is located within the ProSe service range of UE#2 and is configured to perform a lawful interception and/or security operation in relation to UE#2 to be intercepted of the targeted D2D connection. The two LISAs may be connected with each other so as to enable exchange of information relating to their individual operations, as indicated by a two-headed dotted arrow. To this end, the two LISAs are controlled by the controlling network entity, i.e. from the serving/controlling network of UE#1 and UE#2. In this regard, reference is made to the above description of FIG. 1 for further details.

It is noted that more than one LISA may be present and configured to perform a lawful interception and/or security operation in relation to any one of multiple devices of a targeted D2D connection. Namely, a group of LISAs may be located within the proximity service range of any one of the two or more devices in the targeted D2D connection and be configured to perform a lawful interception and/or security operation in relation to a respective device of the D2D connection. That is, the block denoted by LISA#1 in FIG. 2 and/or the block denoted by LISA#2 in FIG. 2 may represent a group of LISAs, all of which exhibit the same functionality as the LISA#1 and/or the LISA#2, as described above. Thereby, the reliability of the required/desired operation in relation to any one of the devices to be intercepted of the targeted D2D connection may be improved.

Generally, ProSe (e.g. D2D) connections/communications in the meaning of the present specification encompass any kind of ProSe (e.g. D2D) connections/communications, including network-controlled ProSe (e.g. D2D) connections/communications, semi-autonomous ProSe (e.g. D2D) connections/communications, and (fully) autonomous ProSe (e.g. D2D) connections/communications. In a network-controlled ProSe (e.g. D2D) connections/communication, network assistance is available at/for both UE#1 and UE#2 in the examples of FIGS. 1 and 2 (the corresponding connections to UE#1 and UE#2 in FIGS. 1 and 2 are present or operable), i.e. both UE#1 and UE#2 are in CONNECTED state and thus capable of receiving direct control from the serving/controlling network (i.e. network assistance) for/when conducting the ProSe (e.g. D2D) connection. In a semi-autonomous ProSe (e.g. D2D) connections/communication, network assistance is available at/for only one of UE#1 and UE#2 in the examples of FIGS. 1 and 2 (only one of the corresponding connections to UE#1 and UE#2 in FIGS. 1 and 2 is present or operable), i.e. only one of UE#1 and UE#2 is in CONNECTED state and thus capable of receiving direct control from the serving/controlling network (i.e. network assistance), while the other one of UE#1 and UE#2 is in IDLE state and/or outside the service/coverage area of the serving/controlling network (i.e. the controlling network entity) and thus incapable of receiving direct control from the serving/controlling network (i.e. network assistance), for/when conducting the ProSe (e.g. D2D) connection. In a (fully) autonomous ProSe (e.g. D2D) connections/communication, network assistance is available at/for neither one of UE#1 and UE#2 in the examples of FIGS. 1 and 2 (none of the corresponding connections to UE#1 and UE#2 in FIGS. 1 and 2 is present or operable), i.e. both UE#1 and UE#2 are in IDLE state and/or outside the service/coverage area of the serving/controlling network (i.e. the controlling network entity) and thus incapable of receiving direct control from the serving/controlling network (i.e. network assistance) for/when conducting the ProSe (e.g. D2D) connection.

The LISA according to exemplifying embodiments of the present invention may be realized/implemented by any local entity, i.e. any communication-enabled entity which is located within the proximity service range of at least one device to be intercepted among the two devices in the targeted D2D connection. On the one hand, the LISA may be realized/implemented by a device capable of conducting a connection of a proximity service with the at least one device to be intercepted, i.e. participating in a ProSe (e.g. D2D) connection with UE#1 and/or UE#2 of FIGS. 1 and 2. Such device may for example comprise any suitable UE, terminal, machine, peer, or the like. On the other hand, the LISA may be realized/implemented by a deployed network node which may by pre-configured to act as LISA. Such network node may for example comprise any suitable access point, small-cell eNB, dedicated LISA device, or the like. Utilizing a network node as a LISA may provide benefits in terms of controlling and data forwarding, especially when the network node already has a working connection/interface in place with the serving/controlling network (e.g. a S1 or X2 connection/interface vie the serving/controlling eNB), while utilizing a local device (e.g. a local UE) as a LISA may provide benefits in terms of flexibility (e.g. in tracking/following the devices in D2D connection).

According to exemplifying embodiments of the present invention, certain network nodes may be deployed and pre-configured (pre-coded) to act as LISA over certain service areas on a sufficiently fine location-resolution basis. In such scenarios, the serving/controlling network is aware of those local network nodes being pre-configured to act as LISA over a certain ProSe service area beforehand, and may thus select and active one or more LISA among these pre-configured (pre-coded) network nodes accordingly. That is a semi-/static LISA configuration may be utilized.

According to exemplifying embodiments of the present invention, irrespective of the presence or absence of any pre-configured (pre-coded) network nodes as mentioned above, devices such as UEs may be dynamically utilized as LISAs over certain service areas. In such scenarios, the serving/controlling network may select and configure one or more devices such as UE to act as LISA among the available devices (as well as de-select and release previously selected and configured devices when their LISA operation is no longer needed or suited for the targeted D2D user or users) on-the-fly. That is a dynamic LISA configuration may be utilized.

According to exemplifying embodiments of the present invention, a device or network node acting as cluster head of a D2D cluster may be determined/selected to act as LISA. Namely, multiple devices, such as devices being capable of a mutual D2D connection/communication, may be (virtually/logically) organized in a D2D cluster, and a device or network node (e.g. a device of the devices in the D2D cluster) may act as D2D cluster head. Such D2D cluster head may be preconfigured as a LISA or with LISA capabilities so as to be able to act as D2D cluster head and LISA for the same (subset of) devices in the D2D cluster at the same time. While not being restricted thereto, such linkage of D2D cluster head operation and LISA operation at a single device or network node may be specifically applicable for semi-autonomous ProSe (e.g. D2D) connections/communications and (fully) autonomous ProSe (e.g. D2D) connections/communications, as explained above.

According to exemplifying embodiments of the present invention, the controlling network entity is configured to perform control in relation to a connection of a proximity service between at least two devices, e.g. UE#1 and/or UE#2 of FIGS. 1 and 2, to determine at least one LISA located within the proximity service range of at least one device to be intercepted among the at least two devices, and to control the determined at least one LISA to perform an operation relating to lawful interception and/or security in relation to the connection of the proximity service. For such control operation, corresponding control information are transmitted to the at least one LISA, i.e. to the local device/s and/or the local network node/s determined to act as LISA for the targeted ProSe (e.g. D2D) connection.

According to exemplifying embodiments of the present invention, the LISA (i.e. the local device/s and/or the local network node/s determined to act as LISA for the targeted ProSe (e.g. D2D) connection) is configured to obtain, from the controlling network entity, i.e. the network node in charge of control in relation to a connection of a proximity service between at least two devices, control information for performing an operation relating to lawful interception and/or security in relation to the connection of the proximity service, and to perform the controlled operation relating to lawful interception and/or security in relation to the connection of the proximity service. In the controlled LISA operation, the LISA may act on the device or devices to be intercepted and/or report/forward required/desired information to the controlling network entity.

Accordingly, in exemplifying embodiments of the present invention, the selected LISA or LISAs may be requested, configured/activated, reconfigured/reactivated and/or controlled with necessary information about the targeted D2D or targeted D2D user/s and also a coordination between selected LISAs to facilitate efficient LISA operations (such as e.g. listening, reporting and forwarding, jamming, warning issuing, etc.).

Accordingly, in exemplifying embodiments of the present invention, intercepted information such as content of D2D communications on the targeted D2D users/s may be forwarded under LI to the serving/controlling network. Also, feedback from the selected LISA or LISAs may be used to reassure the serving/controlling network about LISA operations, and/or to report or indicate necessary updated information about the targeted D2D or the targeted D2D user/s as well as related to the LISA operations, and/or to request changes related to LISA operations.

The above reference to "necessary information" could for example encompass one or more of the following UE-related information: relevant identity, resource allocation, protocol configuration, operation mode, physical transmission format, and so forth.

In the context of LISA control, any determined at least one LISA may be configured and/or activated. In case of local device/s, the control comprises a configuration of the local device/s to act as LISA. In case of local network node/s, the control comprises activation of the local network node/s to act as LISA. Further, in the context of LISA control, a LISA mode may be set (namely, activated/initiated, adjusted/adapted/changed or deactivated/terminated). Namely, the LISA operation may comprise various modes which are controllable by the controlling network entity.

As an example, the LISA operation may be controlled to (the setting of) a passive listening mode or an active monitoring mode. In the passive listening mode, the LISA may collect interception information of the at least one device to be intercepted, comprising at least one of intercept-related information (IRI) and content of communication (CC). In the active monitoring mode, the LISA may join in communication via the connection of the proximity service between the at least two devices. That is, the LISA may be configured to operate as a passive listening agent hidden from targeted D2D UE#1 and/or UE#2, or to operate as an active monitoring agent, e.g. relaying communications for the targeted D2D UE#1 and UE#2. The operation as an active monitoring agent typically makes the LISA operation somewhat visible to the targeted D2D UE#1 and/or UE#2, while the LISA operation is typically hidden from the targeted D2D UE#1 and/or UE#2 in the operation as a passive listening agent. The mode of LISA operation may be chosen case-specifically. When a LISA operates in the passive listening mode, D2D devices may discover it as just a D2D-capable device. However, it may ease LISA determination, if the LISA operation is made somewhat aware to D2D users. In this case, D2D users may detect presence of all possible LISA devices nearby but may not be aware of whether a particular LISA device is operating as LISA for their D2D session or not.

As another example, the LISA operation may be controlled to (the setting of) an intervention mode, in which the LISA intervenes in communication via the connection of the proximity service between the at least two devices, e.g. by issuing an interference signal on resources allocated to the connection of the proximity service between the at least two devices. Such interference signal may be any signal capable of interfering (or jamming) resources of the targeted D2D connection, which are used for control and/or data communication thereon. That is, the LISA may jam the corresponding local D2D connection in preventing unauthorized resource usage of the D2D users, and thus forcing the D2D users (i.e. UE#1 and/or UE#2) to get back to the serving/controlling network using the regular wireless communication access mode when needed. For instance, the LISA may be configured to jam certain control or data transmission signals of the targeted D2D connection by way of the interference signal.

According to exemplifying embodiments of the present invention, jamming may be done in a D2D-connection specific way, i.e. the LISA may e.g. transmit some interference signal on the same radio resources at the same time when the D2D communication is being carried out. As the D2D communication itself will handle the co-channel interference problem with other users, the interference signal may not cause service deterioration for other users, if jamming may be done specific to the targeted D2D connection. For example, jamming may be carried out only for the targeted D2D connection, while it may take into account the current circumstances so that services of other users should not be deteriorated due to the jamming of the targeted D2D connection. Further, jamming may be burst-like transmitted once or repeatedly in order to avoid or at least limit the deterioration of services of other users due to increased level of interference. Typically, the duration of the jamming may be limited to the shortest possible one. In defining the duration of the jamming, limiting the risk of dropping calls or causing pauses to real-time services of other uses, such as showing video streams, may also be taken into consideration. On the other hand, the power level of jamming may also be adjusted according to current circumstances.

Figure 3:
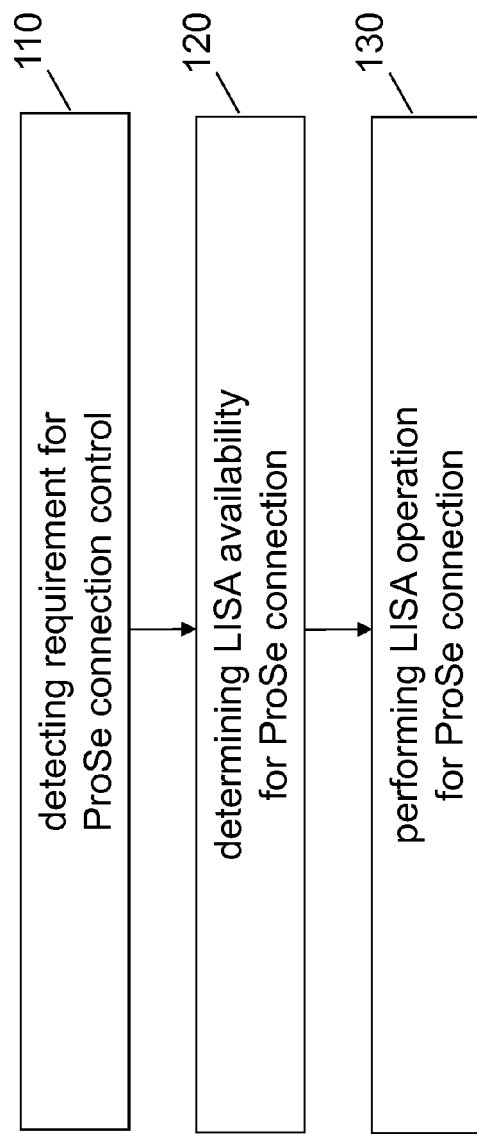
FIG. 3 shows a flowchart illustrating an example of a method according to exemplifying embodiments of the present invention.

FIG. 3 shows a flowchart illustrating an example of a method according to exemplifying embodiments of the present invention.

As shown in FIG. 3, a method according to an exemplifying embodiment of the present invention comprises an operation (110) of detecting a requirement for control in relation to setting up or securing a connection of a proximity service between at least two devices, an operation (120) of determining availability of at least one lawful interception and security agent capable of performing (or carrying out, executing, etc.) an operation relating to lawful interception and/or security in relation to the connection of the proximity service, and an operation (130) of performing (or carrying out, executing, etc.) control in relation to setting up or securing the connection of the proximity service when availability of the at least one lawful interception and security agent is determined.

According to exemplifying embodiments of the present invention, the method of FIG. 3 can be operable in various devices and/or network nodes. For example, the controlling network entity (i.e. a network node in charge of control in relation to the connection of the proximity service between the at least two devices) is operable to execute such method in the example situation of FIG. 4, one of the at least two devices of the connection of the proximity service is operable to execute such method in the example situation of FIG. 5, and one or more of the at least two devices of the connection of the proximity service are operable to execute such method in the example situation of FIG. 6, as described below.

As described hereinafter, according to exemplifying embodiments of the present invention, an admission control for a ProSe connection can be performed such that the ProSe connection (e.g. a direct D2D communication) is allowed/enabled, if it is determined that a sufficient number of LISA candidates are available for assuring proper LI and/or security operation for the ProSe connection, at least to a desired/required extent. Such sufficient number of LISA candidates may comprise a single LISA candidate or multiple LISA candidates, as long as assuring a LI and/or security operation whenever LI needed.

Figure 4:
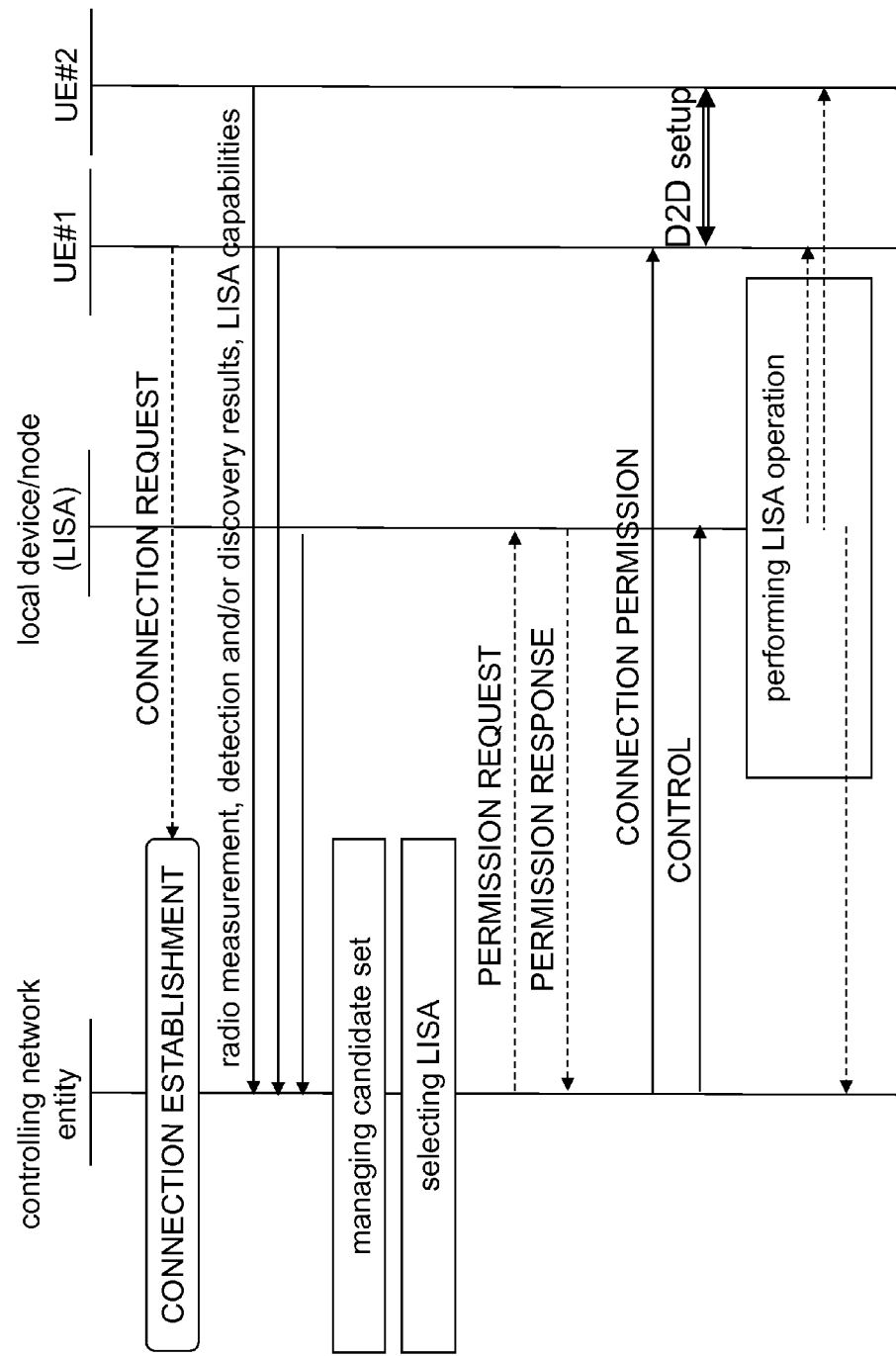
FIG. 4 shows a diagram illustrating a first example of a procedure according to exemplifying embodiments of the present invention.

FIG. 4 shows a diagram illustrating a first example of a procedure according to exemplifying embodiments of the present invention.

In the procedure of FIG. 4, a network-controlled admission control for a new ProSe connection is realized depending on the applicability of a lawful interception and/or security operation for the ProSe connection. Such procedure is operable in an underlying example situation of a system configuration of FIG. 1 or FIG. 2, in which network assistance for the ProSe connection is available at/for UE#1 and/or UE#2. That is, at least one of UE#1 and UE#2 is in CONNECTED state and thus capable of receiving direct control from the serving/controlling network (i.e. network assistance) for/when conducting the ProSe (e.g. D2D) connection. The LISA or LISAs, i.e. the local device/s or network node/s to act as LISA, are to be in CONNECTED state (i.e. communicable with the serving/controlling network).

As shown in FIG. 4, a procedure according to an exemplifying embodiment of the present invention comprises the following operations.

In the context of control requirement detection, the controlling network entity identifies a connection establishment request for setting up the ProSe connection between the at least two devices (denoted as CONNECTION ESTABLISHMENT in FIG. 4). As indicated in FIG. 4 by way of example, such connection establishment request may be identified on the basis of a connection request for setting up the ProSe connection, which may be received from UE#1 but may equally be received from UE#2 or both UE#1 and UE#2, i.e. from any device having network connection. Additionally or alternatively, such connection establishment request may be identified internally/locally at the controlling network entity, which may be accomplished based on a measurement report/discovery report regarding the proximity of two UEs (i.e. UEs are configured to measure or discover the other UEs and report the measurement/discovery result to the network controlling entity, which will make the decision that a D2D connection is to be established between the two UEs). Upon identification of such connection establishment request, the controlling network entity detects that control in relation to setting up a ProSe connection between the at least two devices is required.

In the context of LISA availability determination, the controlling network entity manages a candidate set of available LISAs which are applicable for the ProSe connection between the at least two devices, and selects the at least one available LISA from the managed LISA candidate set. The management of the LISA candidate set comprises forming and updating thereof. The management of the LISA candidate set may be based on one or more of LISA capabilities of devices and/or network nodes within the proximity service range of at least one device to be intercepted among the at least two devices, one or more radio measurement, detection and/or discovery results from at least one device to be intercepted among the at least two devices, and one or more radio measurement, detection and/or discovery results from deployed network nodes being pre-configured to act as lawful interception and security agents or devices with lawful interception and security agent (LISA) capabilities. Such information may be received from respective devices and/or nodes, as indicated in FIG. 4 by way of example.

In this regard, the controlling network entity may obtain lawful interception and security agent (LISA) capabilities of local devices or network nodes (i.e. potential LISAs) indicated by such respective local devices or network nodes. Upon obtaining such LISA capabilities, the controlling network entity may use the same for LISA candidate set management and LISA selection purposes. Such capability of a respective local device or network node could for example relate to (a level or measure of) its suitability, capacity, authority, authorization, etc. with respect to a LISA operation.

Also, the controlling network entity may obtain one or more radio measurement, detection and/or discovery results, or the like, and may form/update the LISA candidate set based on the obtained results or the like.

In a first example, the results or the like may be obtained from the at least one device to be intercepted (i.e. a targeted UE) among the at least two devices of the targeted D2D connection, wherein the LISA candidate set comprises a set of suitable ones of local devices and local deployed network nodes. Based upon reported radio measurement, detection or discovery by the targeted D2D user(s) on-the-fly, the serving/controlling network may form a dynamic set of potential suitable LISA devices, and may then select and configure at least one of them to act as LISA for the targeted D2D users.

In a second example, the results or the like may be obtained from local deployed network nodes and/or local devices with LISA capabilities (i.e. potential LISAs) with regard to the at least one device to be intercepted (i.e. a targeted UE), wherein the LISA candidate set comprises a set of suitable ones of the deployed network nodes and/or local devices with LISA capabilities (i.e. these potential LISAs). Based upon reported radio measurement, detection or discovery by (semi-static) deployed or pre-selected LISA devices, the serving/controlling network may choose some suitable LISA device(s) to form the candidate set for the targeted UE/s. The deployed or pre-selected LISA devices may be configured to scan and report on D2D discovery periodically, or may be requested to detect and report only targeted D2D user(s) in an event-triggered manner.

In a third example, the above examples may be combined such that the results or the like may be obtained from the at least one device to be intercepted (i.e. a targeted UE) among the at least two devices of the targeted D2D connection and from local deployed network nodes and/or local devices with LISA capabilities (i.e. potential LISAs) with regard to the at least one device to be intercepted (i.e. a targeted UE), wherein the LISA candidate set comprises a set of suitable ones of local devices and local deployed network nodes.

In view of the above, the first example may be preferable for a highly dynamic selection and configuration of LISA/s among any LISA-capable UE devices detected by the targeted UE on-the-fly under control of the serving/controlling network. The second example may be preferable when LISA devices are preconfigured or preselected in the service area of interest (e.g. an interception area), such as a local access point, a small-cell eNB or local devices deployed beforehand. In this example, based on certain knowledge about the target UE's location and configuration, the serving/controlling network may request one or several preselected LISA devices to detect and report about the targeted UE. The third example may be considered as an optimized hybrid approach combining the aforementioned benefits of the first and second examples.

In the context of control execution, assuming that at least one LISA for the ProSe connection is determined to be available, the controlling network entity issues a permission for setting up the ProSe connection between the at least two devices (denoted as CONNECTION PERMISSION in FIG. 4). As indicated in FIG. 4 by way of example, such permission may be transmitted to UE#1 (from which the connection establishment request has been received), but it may equally be transmitted to UE#2 or both UE#1 and UE#2, i.e. to any device having network connection. Upon such permission, the ProSe connection can be set up between UE#1 and UE#2 so as to enable secured communications (denoted as D2D setup in FIG. 4). Also, the controlling network entity controls the determined available LISA to perform a LISA operation relating to lawful interception and/or security in relation to the ProSe connection. Upon such control, the determined available LISA can perform the controlled LISA operation in relation to the ProSe connection. Otherwise, in case the LISA availability determination failed, i.e. no LISA (candidate) for the ProSe connection could be determined, the setup control for the ProSe connection is not executed, i.e. the connection establishment request will fail.

Optionally, before issuing the permission and correspondingly controlling the determined available LISA, the controlling network entity may request the permission for setting up the ProSe connection from the determined available LISA (denoted as PERMISSON REQUEST in FIG. 4). If so, the controlling network entity issues the permission and correspondingly controls the determined available LISA only when the requested permission is granted by and received from the determined available LISA (denoted as PERMISSON RESPONSE in FIG. 4). Also, the controlling network entity may request the permission for setting up the ProSe connection from the determined available LISA even already in the context of connection establishment.

It is noted that the sequence of at least some operations in FIG. 4 is adopted in an exemplifying manner for illustrative purposes only. For example, the information relating to LISA candidate set management may be provided/received in any arbitrary sequence, the LISA control may be executed prior to or (substantially) parallel/simultaneous with the permission issuance, or the like.

As described hereinafter, according to an exemplifying embodiment of the present invention, an admission control for a ProSe connection can be performed such that the ProSe connection (e.g. a direct D2D communication) is allowed/enabled for devices outside the service/coverage area of the serving/controlling network, if it is determined that at least one common LISA candidate is available for assuring proper LI and/or security operation for the ProSe connection, at least to a desired/required extent. Such at least one common LISA candidate is to be commonly determined/selected by all involved devices of the ProSe connection between them.

Figure 5:
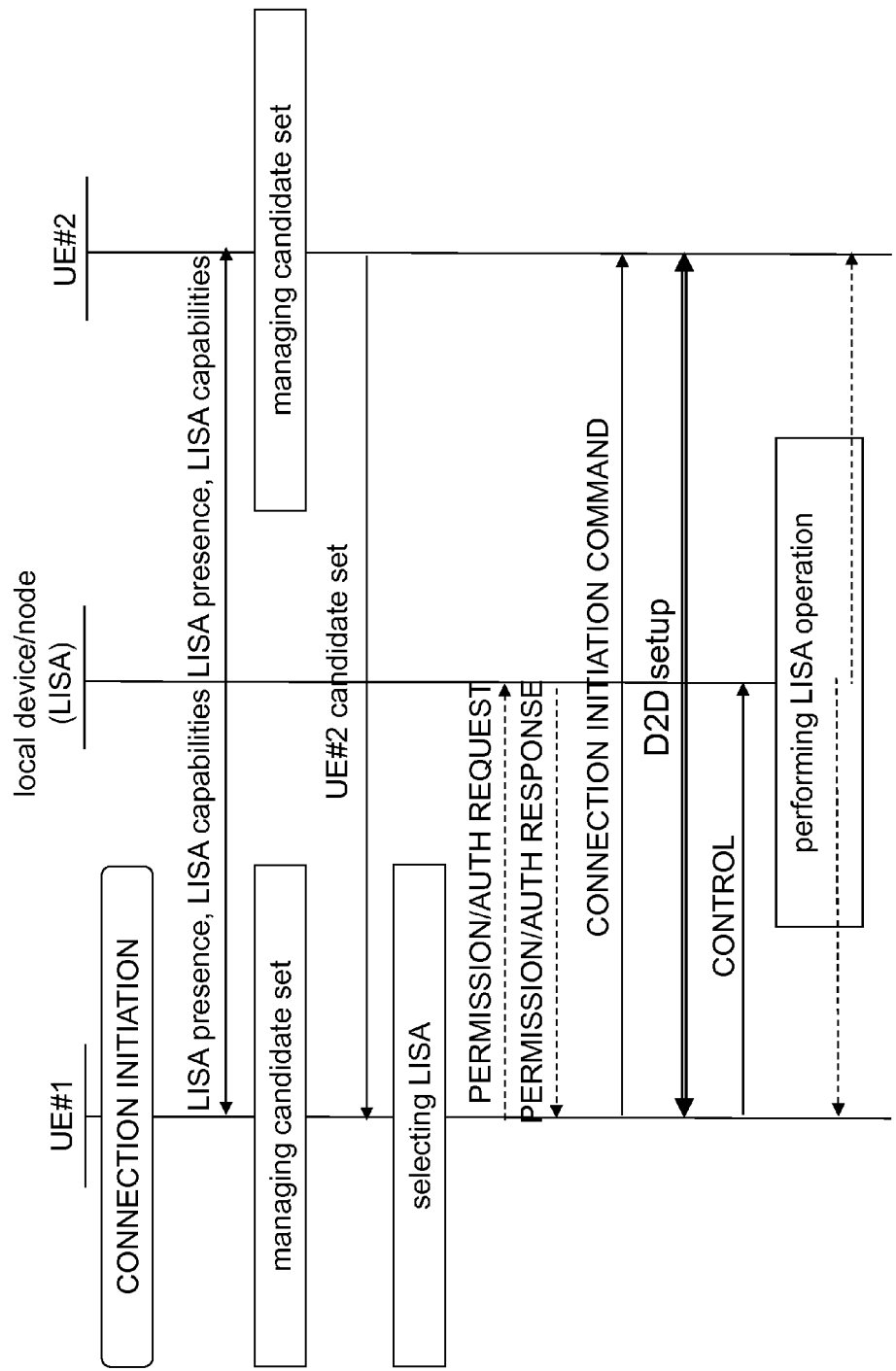
FIG. 5 shows a diagram illustrating a second example of a procedure according to exemplifying embodiments of the present invention.

FIG. 5 shows a diagram illustrating a second example of a procedure according to exemplifying embodiments of the present invention.

In the procedure of FIG. 5, a device-autonomous admission control for a new ProSe connection is realized depending on the applicability of a lawful interception and/or security operation for the ProSe connection. Such procedure is operable in an underlying example situation of a system configuration of FIG. 1 (i.e. a system configuration with a common LISA for the at least two devices), in which network assistance for the ProSe connection is not available at/for UE#1 and UE#2. That is, both UE#1 and UE#2 are in IDLE state and/or outside the service/coverage area of the serving/controlling network (i.e. the controlling network entity) and thus incapable of receiving direct control from the serving/controlling network (i.e. network assistance) for/when conducting the ProSe (e.g. D2D) connection. The common LISA, i.e. the local device or network node to act as LISA, may be but does not need to be in CONNECTED state (i.e. communicable with the serving/controlling network), e.g. depending on its respective level of preconfigured LISA-related suitability including capability, capacity, authority, authorization, and so forth.

As shown in FIG. 5, a procedure according to an exemplifying embodiment of the present invention comprises the following operations. In this regard, it is noted that the individual operations will be described for UE#1 by way of example.

In the context of control requirement detection, the UE#1 identifies a connection initiation request for setting up the ProSe connection between the at least two devices (denoted as CONNECTION INITIATION in FIG. 5). As indicated in FIG. 5 by way of example, such connection initiation request may be identified internally/locally at UE#1, i.e. a device which is to initiate ProSe connection establishment.

In the context of LISA availability determination, the UE#1 manages a candidate set of available LISAs which are locally applicable for the ProSe connection between the at least two devices, i.e. a LISA candidate set at or from the perspective of UE#1, and obtains from UE#2 (i.e. one or more of the other devices involved in the ProSe connection to be set up) a corresponding candidate set of available LISAs which are locally applicable for the ProSe connection between the at least two devices, i.e. a LISA candidate set at or from the perspective of UE#2 in the present example. Then, the UE#1 selects the at least one available LISA from the intersecting set of the managed candidate set and the obtained candidate set or sets of other devices. Thereby, a common LISA for the ProSe connection, which is commonly applicable for the ProSe connection at or from the perspective of all (of the e.g. two) involved devices, is selected.

The management of the LISA candidate set may be based on one or more of LISA capabilities of devices and/or network nodes within the proximity service range of at least one device to be intercepted among the at least two devices, and presence advertisements of available LISAs in the proximity of the one device, i.e. UE#1. Such information may be received from respective devices and/or nodes, as indicated in FIG. 5 by way of example. That is, according to exemplifying embodiments of the present invention, any potential LISA (i.e. any local device and any pre-configured local network node) may advertise its presence (and it LISA capability) in its surrounding environment. Accordingly, the devices located in such surrounding environment can receive such advertisements and use the same for LISA candidate set management and LISA selection.

In the context of control execution, assuming that at least one common LISA for the ProSe connection is determined to be available, the UE#1 issues a connection initiation command for setting up the ProSe connection between the at least two devices (denoted as CONNECTION INITIATION COMMAND in FIG. 5). As indicated in FIG. 5, such connection initiation command is transmitted to at least another one of the at least two devices, i.e. UE#2 in the present example. Upon such connection initiation command, the ProSe connection can be set up between UE#1 and UE#2 so as to enable secured communications (denoted as D2D setup in FIG. 5). Also, the UE#1 controls the determined common LISA to perform a LISA operation relating to lawful interception and/or security in relation to the ProSe connection. Upon such control, the determined available LISA can perform the controlled LISA operation in relation to the ProSe connection. Otherwise, in case the LISA availability determination failed, i.e. no common LISA (candidate) for the ProSe connection could be determined, the setup control for the ProSe connection is not executed, i.e. the connection establishment request will fail.

Optionally, before issuing the connection initiation command and correspondingly controlling the determined common LISA, the UE#1 may confirm relating permission and/or authentication for setting up the ProSe connection from the determined common LISA (denoted as PERMISSON/AUTH REQUEST in FIG. 5). If so, the UE#1 issues the connection initiation command and correspondingly controls the determined common LISA only when the requested permission and/or authentication is granted by and received from the determined available LISA (denoted as PERMISSON/AUTH RESPONSE in FIG. 5). Specifically, the UE#1 may request authentication of the at least another device, i.e. the one or more devices to be involved in the ProSe connection to be set up, and/or the UE#1 may request the permission for setting up the ProSe connection.

It is noted that the sequence of at least some operations in FIG. 5 is adopted in an exemplifying manner for illustrative purposes only. For example, the LISA control may be executed prior to or (substantially) parallel/simultaneous with the connection initiation command issuance, the D2D setup may occur only after the LISA control, or the like.

In the present example scenario, as described above, UE#1 and UE#2 are facilitated and configured to discover, form and update available LISA candidate set on-the-fly individually. For this, any suitable LISA may either implicitly or explicitly advertise its presence to the surrounding environment. To facilitate UE#1 and UE#2 for selection of the common LISA, UE#1 and UE#2 may be configured to advertise the LISA candidate set. One of UE#1 and UE#2, e.g. the device initiating D2D connection establishment, may select one common LISA and contact the selected common LISA to authenticate the other UE and to get permission to carry out direct D2D communications (in a secured manner).

Figure 6:
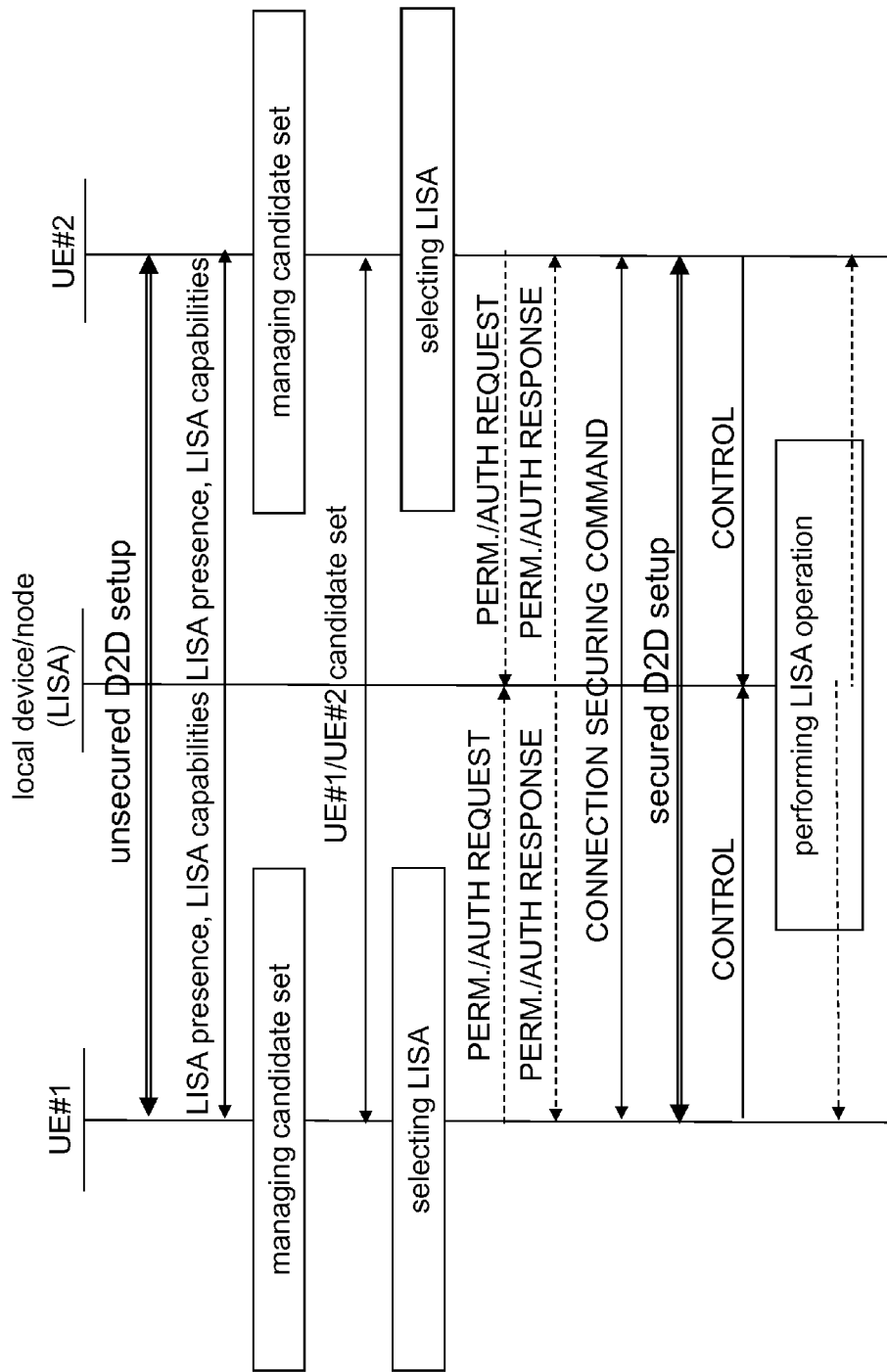
FIG. 6 shows a diagram illustrating a third example of a procedure according to exemplifying embodiments of the present invention.

FIG. 6 shows a diagram illustrating a third example of a procedure according to exemplifying embodiments of the present invention.

In the procedure of FIG. 6, a device-autonomous admission control for an already established ProSe connection is realized depending on the applicability of a lawful interception and/or security operation for the ProSe connection. Such procedure is operable in an underlying example situation of a system configuration of FIG. 1 (i.e. a system configuration with a common LISA for the at least two devices), in which network assistance for the ProSe connection is not available at/for UE#1 and UE#2. That is, both UE#1 and UE#2 are in IDLE state and/or outside the service/coverage area of the serving/controlling network (i.e. the controlling network entity) and thus incapable of receiving direct control from the serving/controlling network (i.e. network assistance) for/when conducting the ProSe (e.g. D2D) connection. The common LISA, i.e. the local device or network node to act as LISA, may be but does not need to be in CONNECTED state (i.e. communicable with the serving/controlling network), e.g. depending on its respective level of preconfigured LISA-related suitability including capability, capacity and authority.

As shown in FIG. 6, a procedure according to an exemplifying embodiment of the present invention the following operations. In this regard, it is noted that the individual operations will be described for only one of the at least two devices involved in the ProSe connection, in present example UE#1, while corresponding operations can be performed at one or more of the remaining devices as well, in present example UE#2.

In the context of control requirement detection, the UE#1 identifies setup of an unsecured ProSe connection between the at least two devices (denoted as unsecured D2D setup in FIG. 6). As indicated in FIG. 5 by way of example, such connection initiation request may be identified internally/locally at UE#1, i.e. a device which is to initiate ProSe connection establishment.

In the context of LISA availability determination, the UE#1 manages a candidate set of available LISAs which are locally applicable for the ProSe connection between the at least two devices, i.e. a LISA candidate set at or from the perspective of UE#1, and exchanges its LISA candidate set with UE#2 (i.e. one or more of the other devices involved in the unsecured ProSe connection) over the unsecured ProSe connection. In this regard, the UE#1 obtains from UE#2 (i.e. one or more of the other devices involved in the ProSe connection to be set up) a corresponding candidate set of available LISAs which are locally applicable for the ProSe connection between the at least two devices, i.e. a LISA candidate set at or from the perspective of UE#2 in the present example. Then, the UE#1 selects the at least one available LISA from the intersecting set of the managed candidate set and the obtained candidate set or sets of other devices. Thereby, a common LISA for the ProSe connection, which is commonly applicable for the ProSe connection at or from the perspective of all (of the e.g. two) involved devices, is selected.

The management of the LISA candidate set may be based on one or more of LISA capabilities of devices and/or network nodes within the proximity service range of at least one device to be intercepted among the at least two devices, and presence advertisements of available LISAs in the proximity of the one device, i.e. UE#1. Such information may be received from respective devices and/or nodes, as indicated in FIG. 5 by way of example. That is, according to exemplifying embodiments of the present invention, any potential LISA (i.e. any local device and any pre-configured local network node) may advertise its presence (and it LISA capability) in its surrounding environment. Accordingly, the devices located in such surrounding environment can receive such advertisements and use the same for LISA candidate set management and LISA selection.

In the context of control execution, assuming that at least one common LISA for the ProSe connection is determined to be available, the UE#1 issues a connection securing command for setting up a secured ProSe connection between the at least two devices (denoted as CONNECTION SECURING COMMAND in FIG. 6). As indicated in FIG. 6, such connection securing command is transmitted to at least another one of the at least two devices, i.e. UE#2 in the present example. Due to a similar operation by the UE#2, the UE#1 may receive a corresponding connection securing command from the UE#2. Upon such connection securing command, the unsecured ProSe connection can be secured or, stated in other words, a secured ProSe connection can be set up between UE#1 and UE#2 so as to enable secured communications (denoted as secured D2D setup in FIG. 6). Also, the UE#1 controls the determined common LISA to perform a LISA operation relating to lawful interception and/or security in relation to the ProSe connection. Upon such control, the determined available LISA can perform the controlled LISA operation in relation to the ProSe connection. Otherwise, in case the LISA availability determination failed, i.e. no common LISA (candidate) for the ProSe connection could be determined, the securing control for the ProSe connection is not executed, i.e. the connection establishment request will fail.

Optionally, before issuing the connection securing command and correspondingly controlling the determined common LISA, the UE#1 may confirm relating permission and/or authentication for setting up a secured ProSe connection from the determined common LISA (denoted as PERM/AUTH REQUEST in FIG. 6). If so, the UE#1 issues the connection securing command and correspondingly controls the determined common LISA only when the requested permission and/or authentication is granted by and received from the determined available LISA (denoted as PERM/AUTH RESPONSE in FIG. 6). Specifically, the UE#1 may request authentication of the at least another device, i.e. the one or more devices to be involved in the ProSe connection to be set up, and/or the UE#1 may request the permission for securing the ProSe connection or, stated in other words, for setting up a secured ProSe connection.

It is noted that the sequence of at least some operations in FIG. 6 is adopted in an exemplifying manner for illustrative purposes only. For example, the LISA control may be executed prior to or (substantially) parallel/simultaneous with the connection securing command issuance, the secured D2D setup may occur only after the LISA control, or the like.

In the present example scenario, as described above, a direct D2D connection is setup autonomously between UE#1 and UE#2 for unsecured communications. UE#1 and UE#2 are facilitated and configured to discover, form and update available LISA candidate set on-the-fly individually. For this, any suitable LISA may either implicitly or explicitly advertise its presence to the surrounding environment. To facilitate UE#1 and UE#2 for selection of the common LISA, UE#1 and UE#2 may be configured to advertise/exchange their LISA candidate sets to each other. Both UE#1 and UE#2 may select one common LISA and contact the selected common LISA to authenticate themselves to each other and to get permission to carry out direct D2D communications (in a secured manner).

In view of the exemplifying procedures of FIGS. 5 and 6, as described above, the following is to be noted.

The LISA operation at a local device or network node can be controlled either by a UE when the UE selects the local device or network node as (common) LISA (e.g. before or upon the permission/authentication request from UE#1 in the examples of FIGS. 5 and 6) in case of device-autonomous admission control. In this regard, the LISA may be used as authentication/security entity to allow UEs to authenticate with each other and setup a connection, as explained above. In such case, the LISA does not need to be controlled by the serving/controlling network (i.e. a controlling network entity).

Also, when having corresponding LISA capabilities, the UE may select itself as the (common) LISA (in the form of a local device) in case of device-autonomous admission control. Namely, while UE#1 and LISA are illustrated as separate instances in the examples of FIGS. 5 and 6, UE#1 and LISA may be realized as/within a single instance, i.e. UE#1 may incorporate the LISA functionality as such. In this regard, UE#1 should be authorized to act as the LISA by itself for a ProSe (e.g. D2D) connection of itself and other UE/UEs in its proximity (namely, within its ProSe service range).

Moreover, the LISA may be another local device (UE) or local network node which should be able to authenticate UE#1 and UE#2 and determine whether to intercept UE#1 and/or UE#2 by itself. In this regard, the LISA would not be controlled by UE#1. Namely, a corresponding procedure would correspond to the operations from CONNECTION INITIATION up to, and including D2D setup, in the examples of FIGS. 5 and 6. That is, the operations of PERMISSION/AUTH REQUEST/RESPONSE may be applicable, but the CONTROL operation from UE#1 towards the LISA there would not be applicable.

Generally, it is noted that LISA entities may preferably be pre-selected and pre-coded in case they are also operating autonomously or residing out of the service/coverage area of the serving/controlling network. Otherwise, LISA entities may be dynamically selected and configured among suitable local devices (UEs) and/or local network nodes.

Further, it is noted that exemplifying embodiments of the present invention facilitate for an on-the-fly update of LISA candidate set or LISA reselection, whether it is hidden from the targeted D2D devices or not, due to, e.g., mobility of either the selected LISA or the targeted UE devices. The LISA candidate set may or may not be a part of ProSe discovery context of the targeted UE devices. In general, LISA detection may be considered as an extended part of UE radio measurement, especially when LISA operation is hidden from the targeted UE devices.

By virtue of exemplifying embodiments of the present invention, as evident from the above, an available and capable local entity (including a local device and/or a local network node), which is trusted by the serving/controlling network operator, can be utilized as a lawful interception and security agent (LISA), and the presence/availability of such LISA can be considered for admission control of a connection of a proximity service. Thereby, lawful interception and security based admission control is facilitated in a case in which devices, including at least one device to be intercepted, use proximity service connections (such as e.g. direct D2D communications over the air interface without routing via any infrastructure network element).

Stated in other words, exemplifying embodiments of the present invention facilitate that admission control (which may include a connection setup permission, a connection initiation permission, a connection securing permission, user/device authentication, connection and/or mobility management, etc.) for a connection of a proximity service is made depending on the existence or availability of a suitable LISA candidate, which is possible even on-the-fly. Namely, when a suitable LISA candidate is existing or available, applicability of a lawful interception and/or security operation for the connection of the proximity service is ensured, thus assuring LI and/or security features for the connection of the proximity service in case of a successful/positive admission control.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and systems, including both software and/or hardware thereof.

Respective exemplifying embodiments of the present invention are described below referring to FIG. 7, while for the sake of brevity reference is made to the detailed description of respective corresponding configurations/setups, schemes, methods and functionality, principles and operations according to FIGS. 1 to 6.

Figure 7:
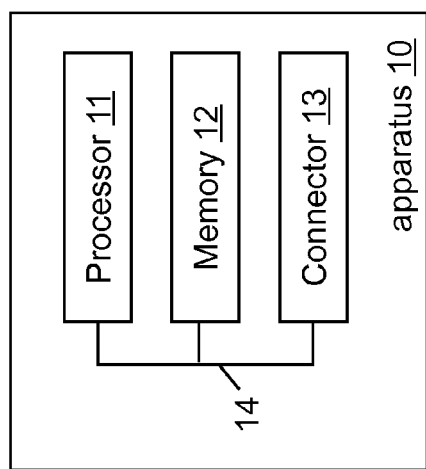
FIG. 7 shows a schematic diagram illustrating an example of a structure of apparatuses according to exemplifying embodiments of the present invention.

FIG. 7 shows a schematic diagram illustrating an example of a structure of apparatuses according to exemplifying embodiments of the present invention.

In FIG. 7, the solid line blocks are basically configured to perform respective methods, procedures and/or functions as described above. The entirety of solid line blocks are basically configured to perform the methods, procedures and/or functions as described above, respectively. With respect to FIG. 7, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIG. 7, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

As indicated in FIG. 7, according to exemplifying embodiments of the present invention, an apparatus 10 may comprise at least one processor 11 and at least one memory 12 (and possibly also at least one connector 13), which may be operationally connected or coupled, for example by a bus 14 or the like, respectively.

The processor 11 and/or the connector 13 of the apparatus 10 may also include a modem or the like to facilitate communication over a (hardwire or wireless) link, respectively. The connector 13 of the apparatus 10 may include a suitable transmitter, receiver or transceiver connected or coupled to one or more antennas, antenna units, such as antenna arrays or communication facilities or means for (hardwire or wireless) communications with the linked, coupled or connected device(s), respectively. The connector 13 of the apparatus 10 is generally configured to communicate with at least one other apparatus, device, node or entity (in particular, the connector thereof).

The memory 12 of the apparatus 10 may store respective programs, program products, macros or applets, etc. or parts of them, which may be assumed to comprise program instructions or computer program code that, when executed by the respective processor, enables the respective electronic device or apparatus to operate in accordance with exemplifying embodiments of the present invention.

In general terms, respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 10 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

The thus illustrated apparatus 10 may represent a (part of a) controlling network entity according to exemplifying embodiments of the present invention, and it may be configured to perform (or carry out, execute, etc.) a procedure and/or exhibit a functionality as described (for the controlling network entity) in any one of FIGS. 1 to 4. Also, the thus illustrated apparatus 10 may represent a (part of a) device (such as a UE) according to exemplifying embodiments of the present invention, and it may be configured to perform (or carry out, execute, etc.) a procedure and/or exhibit a functionality as described (for UE#1 and/or UE#2) in any one of FIGS. 1 to 3, 5, and 6.

In this case, the apparatus 10 or its processor 11 (possibly together with computer program code stored in the memory 12), in its most basic form, is configured to detect a requirement for control in relation to setting up or securing a connection of a proximity service between at least two devices, determine availability of at least one lawful interception and security agent capable of performing (or carrying out, executing, etc.) an operation relating to lawful interception and/or security in relation to the connection of the proximity service, and to perform (or carry out, execute, etc.) control in relation to setting up or securing the connection of the proximity service when availability of the at least one lawful interception and security agent is determined.

The thus illustrated apparatus 10 may represent a (part of a) LISA according to exemplifying embodiments of the present invention, i.e. a device or network node capable of acting as a LISA, and it may be configured to perform (or carry out, execute, etc.) a procedure and/or exhibit a functionality as described (for the LISA) in any one of FIGS. 1, 2, and 4 to 6.

For further details regarding the operability/functionality of the individual apparatuses according to exemplifying embodiments of the present invention, reference is made to the above description in connection with any one of FIGS. 1 to 6, respectively.

As mentioned above, any apparatus according to exemplifying embodiments of the present invention may be structured by comprising respective means for performing corresponding operations, procedures and/or functions. For example, such means may be implemented/realized on the basis of an apparatus structure, as exemplified in FIG. 6 above, i.e. by one or more processors 11, one or more memories 12, one or more connectors 13, or any combination thereof.

Figure 8:
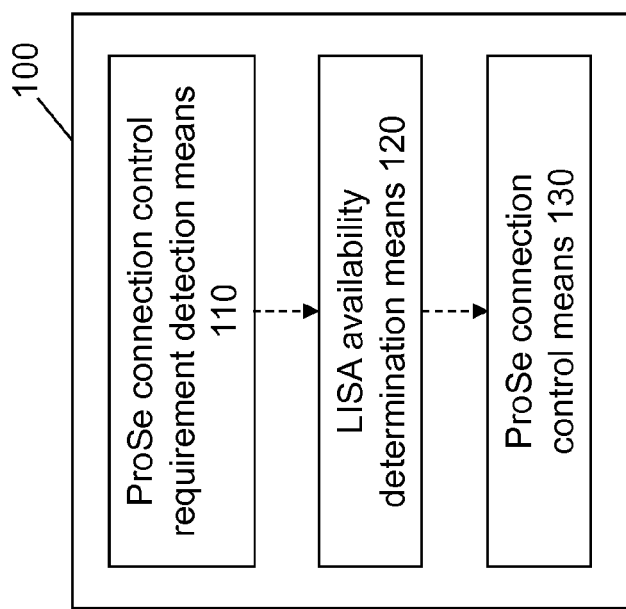
FIG. 8 shows a schematic diagram illustrating another example of a structure of apparatuses according to exemplifying embodiments of the present invention.

FIG. 8 shows a schematic diagram illustrating another example of a structure of apparatuses according to exemplifying embodiments of the present invention.

As shown in FIG. 8, an apparatus 100 according to exemplifying embodiments of the present invention may be operable as a controlling network entity or as a device (such as a UE). The apparatus 100 may comprise (at least) means for detecting a requirement for control in relation to setting up or securing a connection of a proximity service between at least two devices (denoted as ProSe connection control requirement detection means 110), means for determining availability of at least one lawful interception and security agent capable of performing an operation relating to lawful interception and/or security in relation to the connection of the proximity service (denoted as LISA availability determination means 120), and means for performing control in relation to setting up or securing the connection of the proximity service when availability of the at least one lawful interception and security agent is determined (denoted as ProSe connection control means 130).

According to exemplifying embodiments, as described above, it is noted that the ProSe connection control requirement detection means 110 may further be further for (or comprise means for) identifying a connection establishment request for setting up the connection of the proximity service between the at least two devices, and/or the ProSe connection control means 130 may further be further for (or comprise means for) issuing a permission for setting up the connection of the proximity service between the at least two devices to the at least one device being capable of receiving network assistance for the connection of the proximity service and controlling the at least one available lawful interception and security agent to perform the operation relating to lawful interception and/or security in relation to the connection of the proximity service, and/or the LISA availability determination means 120 may further be further for (or comprise means for) managing a candidate set of available lawful interception and security agents which are applicable for the connection of the proximity service between the at least two devices and selecting the at least one available lawful interception and security agent from the managed candidate set of lawful interception and security agents.

According to exemplifying embodiments, as described above, it is noted that the ProSe connection control requirement detection means 110 may further be further for (or comprise means for) identifying a connection initiation request for setting up the connection of the proximity service between the at least two devices, and/or the ProSe connection control means 130 may further be further for (or comprise means for) issuing a connection initiation command for setting up the connection of the proximity service between the at least two devices to at least another device of the at least two devices, and/or the ProSe connection control means 130 may further be further for (or comprise means for) controlling the at least one available lawful interception and security agent to perform the operation relating to lawful interception and/or security in relation to the connection of the proximity service, and/or the ProSe connection control means 130 may further be further for (or comprise means for) requesting authentication of the at least another device from the at least one available lawful interception and security agent, and/or the ProSe connection control means 130 may further be further for (or comprise means for) requesting the permission for setting up the connection of the proximity service from the at least one available lawful interception and security agent, and/or the LISA availability determination means 120 may further be further for (or comprise means for) managing a candidate set of available lawful interception and security agents which are applicable, at the one device, for the connection of the proximity service between the at least two devices, obtaining a candidate set of available lawful interception and security agents which are applicable, at at least another device of the at least two devices, for the connection of the proximity service between the at least two devices, and selecting the at least one available lawful interception and security agent, as commonly applicable for the connection of the proximity service at the one device and the at least another device, from the intersecting set of the managed candidate set and the obtained candidate set.

According to exemplifying embodiments, as described above, it is noted that the ProSe connection control requirement detection means 110 may further be further for (or comprise means for) identifying setup of an unsecured connection of the proximity service between the at least two devices, and/or the ProSe connection control means 130 may further be further for (or comprise means for) controlling the at least one available lawful interception and security agent to perform the operation relating to lawful interception and/or security in relation to the connection of the proximity service, and/or the ProSe connection control means 130 may further be further for (or comprise means for) requesting authentication of the at least another device from the at least one available lawful interception and security agent, and/or the ProSe connection control means 130 may further be further for (or comprise means for) requesting the permission for securing the connection of the proximity service from the at least one available lawful interception and security agent, and/or the LISA availability determination means 120 may further be further for (or comprise means for) managing a candidate set of available lawful interception and security agents which are applicable, at the one device, for the connection of the proximity service between the at least two devices, obtaining a candidate set of available lawful interception and security agents which are applicable, at least another device of the at least two devices, for the connection of the proximity service between the at least two devices, and selecting the at least one available lawful interception and security agent, as commonly applicable for the connection of the proximity service at the one device and the at least another device, from the intersecting set of the managed candidate set and the obtained candidate set.

In FIG. 8, the dashed arrows indicate a possible sequence of operations in terms of the participation of the individual means by way of example only. Yet, it is to be noted that the individual means are generally independent from each other.

According to exemplifying embodiments of the present invention, any one of the processor, the memory and the connector may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for lawful interception and security based admission control for proximity service. Such measures could comprise detecting a requirement for control in relation to setting up or securing a connection of a proximity service between at least two devices, determining availability of at least one lawful interception and security agent capable of performing an operation relating to lawful interception and/or security in relation to the connection of the proximity service, and performing control in relation to setting up or securing the connection of the proximity service when availability of the at least one lawful interception and security agent is determined.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
ADMF Administration Function
CC Content of Communication
D2D device-to-device
DRSF D2D Registration Server Function
eNB enhanced NodeB
EPC Evolved Packet Core
IRI Intercept-Related Information
LEMF Law Enforcement Monitoring Facility
LI Lawful Interception
LISA Lawful Interception and Security Agent
LTE Long Term Evolution
LTE-A Long Term Evolution Advanced
M2M machine-to-machine
MME Mobility Management Entity
P2P peer-to-peer
P-GW Packet Gateway
ProSe Proximity Service
S-GW Serving Gateway
T2T terminal-to-terminal
UE User equipment

The invention claimed is:

1. A method comprising:
   detecting, by a network entity providing a lawful interception and security based admission control for a proximity service, a requirement for control in relation to setting up or securing a connection of the proximity service between at least two devices;
   determining admission availability of at least one lawful interception and security agent capable of performing an operation relating to lawful interception and/or security in relation to the connection of the proximity service; and
   performing control in relation to setting up or securing the connection of the proximity service when availability of the at least one lawful interception and security agent is determined for facilitating the lawful interception and/or security in relation to the connection of the proximity service.

2. The method according to claim 1, wherein at least one of the at least two devices is capable of receiving network assistance for the connection of the proximity service.

3. The method according to claim 2, wherein detecting the requirement for control in relation to setting up or securing the connection of the proximity service comprising:
   identifying a connection establishment request for setting up the connection of the proximity service between the at least two devices.

4. The method according to claim 2, wherein performing the control in relation to setting up or securing the connection of the proximity service comprising:
   issuing a permission for setting up the connection of the proximity service between the at least two devices to the at least one device being capable of receiving network assistance for the connection of the proximity service; and
   controlling the at least one available lawful interception and security agent to perform the operation relating to lawful interception and/or security in relation to the connection of the proximity service.

5. The method according to claim 2, wherein determining availability of the at least one lawful interception and security agent comprising:
   managing a candidate set of available lawful interception and security agents which are applicable for the connection of the proximity service between the at least two devices; and
   selecting the at least one available lawful interception and security agent from the managed candidate set of lawful interception and security agents.

6. The method according to claim 1, wherein
   the method is operable at or by one device of the at least two devices, and
   the at least two devices are not capable of receiving network assistance for the connection of the proximity service.

7. The method according to claim 6, wherein detecting the requirement for control in relation to setting up or securing the connection of the proximity service comprising:
   identifying a connection initiation request for setting up the connection of the proximity service between the at least two devices.

8. The method according to claim 1, wherein
   the method is operable at or by all of the at least two devices, and
   the at least two devices are not capable of receiving network assistance for the connection of the proximity service.

9. The method according to claim 8, wherein detecting the requirement for control in relation to setting up or securing the connection of the proximity service comprising:
   identifying setup of an unsecured connection of the proximity service between the at least two devices.

10. An apparatus comprising:
    a processor, and a memory configured to store computer program code, wherein the processor is configured to cause the apparatus to perform:
    detecting, by providing a lawful interception and security based admission control for a proximity service, a requirement for control in relation to setting up or securing a connection of the proximity service between at least two devices;

determining admission availability of at least one lawful interception and security agent capable of performing an operation relating to lawful interception and/or security in relation to the connection of the proximity service; and performing control in relation to setting up or securing the connection of the proximity service when availability of the at least one lawful interception and security agent is determined for facilitating the lawful interception and/or security in relation to the connection of the proximity service.

11. The apparatus according to claim 10, wherein at least one of the at least two devices is capable of receiving network assistance for the connection of the proximity service.

12. The apparatus according to claim 11, wherein detecting the requirement for control in relation to setting up or securing the connection of the proximity service comprising:
identifying a connection establishment request for setting up the connection of the proximity service between the at least two devices.

13. The apparatus according to claim 11, wherein performing the control in relation to setting up or securing the connection of the proximity service comprising:
issuing a permission for setting up the connection of the proximity service between the at least two devices to the at least one device being capable of receiving network assistance for the connection of the proximity service; and
controlling the at least one available lawful interception and security agent to perform the operation relating to lawful interception and/or security in relation to the connection of the proximity service.

14. The apparatus according to claim 11, wherein determining availability of the at least one lawful interception and security agent comprising:
managing a candidate set of available lawful interception and security agents which are applicable for the connection of the proximity service between the at least two devices; and
selecting the at least one available lawful interception and security agent from the managed candidate set of lawful interception and security agents.

15. The apparatus according to claim 10, wherein
the apparatus is operable as or at one device of the at least two devices, and
the at least two devices are not capable of receiving network assistance for the connection of the proximity service.

16. The apparatus according to claim 15, wherein detecting the requirement for control in relation to setting up or securing the connection of the proximity service comprising:
identifying a connection initiation request for setting up the connection of the proximity service between the at least two devices.

17. The apparatus according to claim 10, wherein
the apparatus is operable as or by at of the at least two devices, and
the at least two devices are not capable of receiving network assistance for the connection of the proximity service.

18. The apparatus according to claim 17, wherein detecting the requirement for control in relation to setting up or securing the connection of the proximity service comprising:
identifying setup of an unsecured connection of the proximity service between the at least two devices.

19. A computer program product comprising a non-transitory computer-readable medium having computer-executable computer program code thereon which, when the computer program code is executed on a computer, is configured to cause the computer to perform at least the following:
detecting, by a network entity providing a lawful interception and security based admission control for a proximity service, a requirement for control in relation to setting up or securing a connection of the proximity service between at least two devices;
determining admission availability of at least one lawful interception and security agent capable of performing an operation relating to lawful interception and/or security in relation to the connection of the proximity service; and
performing control in relation to setting up or securing the connection of the proximity service when availability of the at least one lawful interception and security agent is determined for facilitating the lawful interception and/or security in relation to the connection of the proximity service.

* * * * *